United States Patent
Maruta et al.

(10) Patent No.: US 6,460,332 B1
(45) Date of Patent: Oct. 8, 2002

(54) PRESSURE OIL ENERGY RECOVER/REGENATION APPARATUS

(75) Inventors: Kazuhiro Maruta, Kawaguchi; Nobumi Yoshida, Oyama, both of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/432,163

(22) Filed: Nov. 2, 1999

(30) Foreign Application Priority Data

Nov. 4, 1998 (JP) .......................... 10-313274

(51) Int. Cl.$^7$ ............................... F16D 31/02
(52) U.S. Cl. .......................... 60/414; 60/484
(58) Field of Search ............ 60/413, 414, 911, 60/431, 477, 479, 484

(56) References Cited

U.S. PATENT DOCUMENTS

| | | | | |
|---|---|---|---|---|
| 3,512,072 A | * | 5/1970 | Karazija et al. | 60/911 X |
| 3,922,854 A | * | 12/1975 | Coeurderoy | 60/413 |
| 4,495,768 A | * | 1/1985 | Valavaara | 60/414 |
| 4,702,076 A | * | 10/1987 | Rosman | 60/414 X |
| 4,707,988 A | * | 11/1987 | Palmers | 60/413 |
| 4,723,107 A | * | 2/1988 | Schmid | 322/35 |
| 4,761,953 A | * | 8/1988 | Rosman | 61/414 |
| 4,761,954 A | * | 8/1988 | Rosman | 60/414 |
| 4,813,234 A | * | 3/1989 | Nikolaus | 60/414 X |
| 4,928,487 A | * | 5/1990 | Nikolaus | 60/414 |
| 4,961,316 A | * | 10/1990 | Corke et al. | 60/431 |
| 5,179,836 A | * | 1/1993 | Dantigraber | 60/414 X |
| 5,505,043 A | * | 4/1996 | Baginski et al. | 60/477 |
| 5,649,422 A | * | 7/1997 | Baginski et al. | 60/431 |
| 6,005,360 A | * | 12/1999 | Pace | 60/414 X |
| 6,370,873 B1 | * | 4/2002 | Schaich et al. | 60/413 |

* cited by examiner

Primary Examiner—John E. Ryznic
(74) Attorney, Agent, or Firm—Armstrong, Westerman & Hattori, LLP.

(57) ABSTRACT

A pressure oil energy recovery apparatus or pressure oil energy recovery/regeneration apparatus that does not require much room and can be mounted within a narrow space, capable of broadening the range of applications for recovered energy. A hydraulic pump motor is actuated by the inflow of the return pressure oil flowing out of a hydraulic actuator. The drive force of the hydraulic pump motor is input to allow an electric motor to generate electric energy. The electric energy generated by the electric motor is stored in a battery. When the energy of pressure oil is regenerated, the energy expended during the actuation of the hydraulic actuator by the hydraulic pump is supplemented with the electric energy stored in the battery.

7 Claims, 6 Drawing Sheets

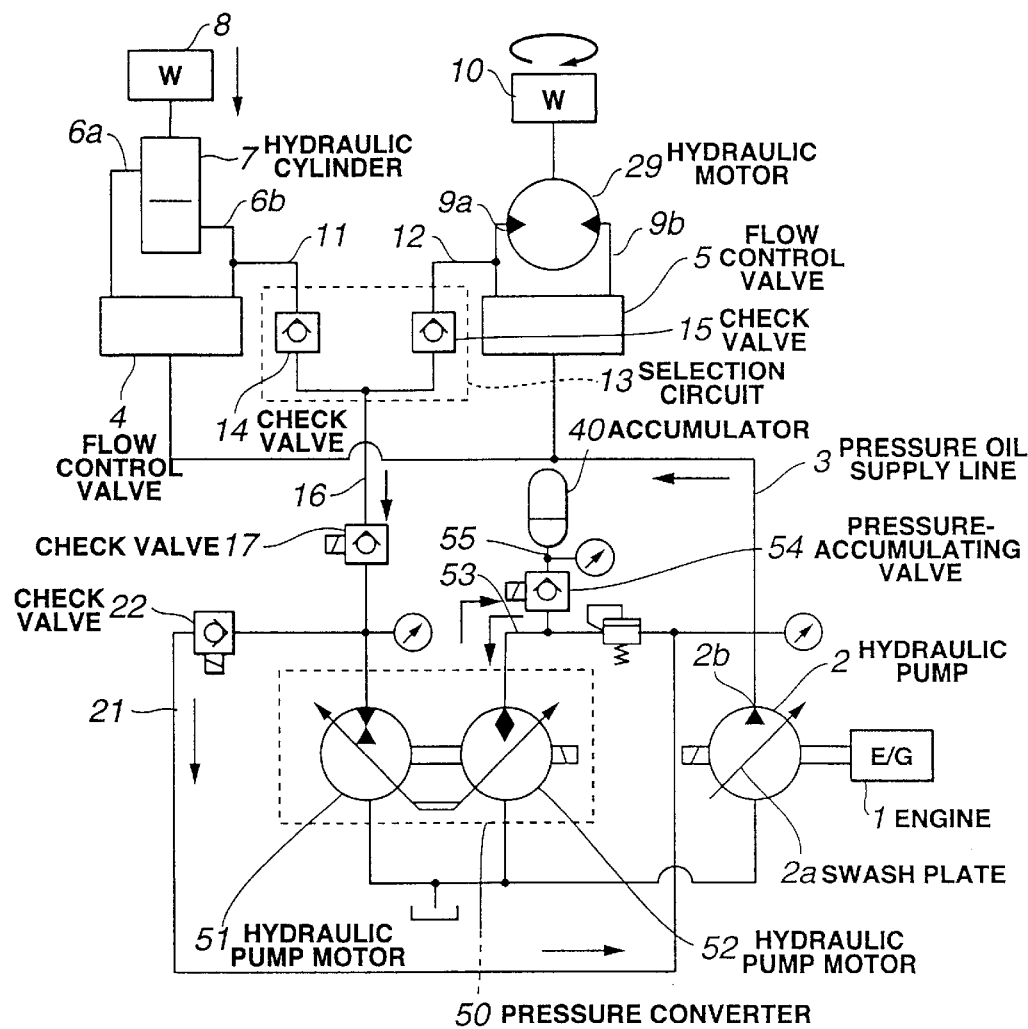
FIG.8(a)
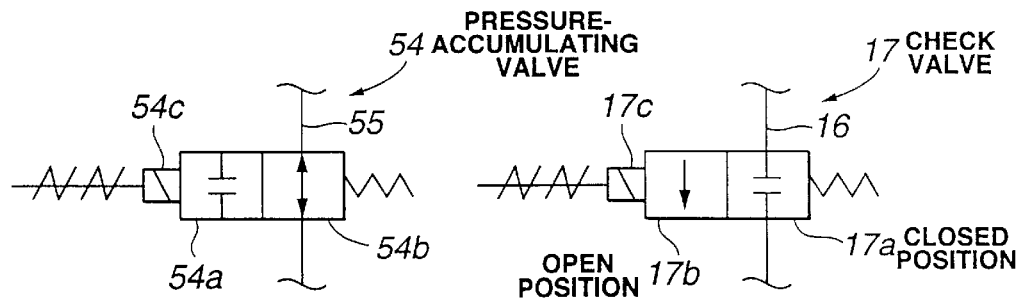
FIG.8(b)     FIG.8(c)

PRESSURE OIL ENERGY RECOVER/REGENATION APPARATUS

BACKGROUND OF THE INVENTION

1. Field of the Invention

The present invention relates to a recovery apparatus for recovering the energy of the return pressure oil flowing out of a hydraulic actuator and to a recovery/regeneration apparatus for recovering the energy of the return pressure oil and reusing the recovered energy during the driving of the aforementioned hydraulic actuator.

2. Description of the Related Art

Recovery/regeneration apparatus for recovering the energy of the return pressure oil flowing out of a hydraulic actuator, and reusing the recovered energy during the driving of the aforementioned hydraulic actuator are already common knowledge. Such recovery/regeneration apparatus are incorporated and mounted in the hydraulic circuits of hydraulic shovels and other types of construction machinery, for example.

For example, Japanese Patent Publication No. 33922/1991 discloses the system for the recovery and reuse of pressure oil depicted in FIG. 7.

Specifically, the hydraulic circuit depicted in FIG. 7 is such that the pressure oil discharged from a hydraulic pump 32 is fed to a hydraulic cylinder 33 via a pressure oil supply line 42, whereby the hydraulic cylinder 33 is actuated and a load 34 (for example, a piece of machinery) is operated.

Pressure oil flows out of the hydraulic cylinder 33 if the supply of pressure oil from the hydraulic pump 32 to the hydraulic cylinder 33 is stopped. As shown by arrow A1, the return pressure oil flowing out of the hydraulic cylinder 33 enters a pressure converter 36 via a line 35. The pressure converter 36 comprises two hydraulic pump motors 37 and 38.

The hydraulic pump motor 37 is rotated by the return pressure oil that enters the hydraulic pump motor 37. The rotation of the hydraulic pump motor 37 actuates the hydraulic pump motor 38. The pressure oil is therefore discharged from the hydraulic pump motor 38, as shown by arrow A2. The pressure oil discharged from the hydraulic pump motor 38 is prevented from flowing back into the pressure oil supply line 42 by a check valve 41, and is fed to an accumulator 40 via a line 39. In the accumulator 40, the energy of the pressure oil is stored by being converted to the compression energy of the gas sealed inside.

The energy of pressure oil is thus recovered and stored. The following operation is performed to regenerate the energy of pressure oil.

Specifically, actuating the hydraulic pump 32 causes the pressure oil discharged from the hydraulic pump 32 to be fed to the pressure oil supply line 42, as shown by arrow B1. Here, the pressure oil stored in the accumulator 40 flows into the hydraulic pump motor 38 in addition to the pressure oil discharged from the hydraulic pump 32, as shown by arrow B2. The hydraulic pump motor 38 is therefore rotated by the combined energy of the pressure oil stored in the accumulator 40 and the actuation energy of the hydraulic pump 32.

The rotation of the, hydraulic pump motor 38 actuates the hydraulic pump motor 37. Pressure oil is therefore discharged from the hydraulic pump motor 37 and fed to the hydraulic cylinder 33, as shown by arrow B3. Consequently, the hydraulic cylinder 33 is expanded, and the load 34 is operated.

With this hydraulic circuit, however, energy reuse is limited to a single hydraulic cylinder 33 when the energy of the return pressure oil from this hydraulic cylinder 33 is recovered, stored in pressurized form, and regenerated.

In view of this, a hydraulic circuit has been proposed to allow energy to be reused in an assembly composed of a plurality of hydraulic actuators when the energy of the return pressure oil from these hydraulic actuators is recovered, stored in pressurized form, and regenerated. The present applicants have already filed International Application PCT/JP97/03416.

This hydraulic circuit is depicted in FIG. 8(a).

Specifically, the hydraulic circuit depicted in FIG. 8(a) is substantially configured such that a plurality of hydraulic actuators (that is, a hydraulic cylinder 7 and a hydraulic motor 29) are actuated, and the corresponding loads 8 and 10 (for example, pieces of machinery) are operated according to a procedure in which the pressure oil discharged from a hydraulic pump 2 is fed to the hydraulic cylinder 7 and hydraulic motor 29 via a pressure oil supply line 3.

Line 16 of the hydraulic circuit depicted in FIG. 8(a) is provided with a check valve 17. A detailed structure of this check valve 17 is depicted in FIG. 8(c). As shown in FIG. 8(c), the check valve 17 is a magnetic switching valve that is urged to a closed position 17a or open position 17b by the application of an ON or OFF electric current command to a solenoid 17c via an electric signal line. When the check valve 17 is in the closed position 17a, the flow of pressure oil into the check valve 17 is stopped, and when the check valve 17 is in the open position 17b, the pressure oil flows in and out of the check valve 17 in a single direction. A check valve 22 provided to a line 21 is configured in the same manner as the check valve 17.

In addition, a pressure-accumulating valve 54 is provided to the line 55 of the hydraulic circuit depicted in FIG. 8(a). A detailed structure of this pressure-accumulating valve 54 is depicted in FIG. 8(b). As shown in FIG. 8(b), the pressure-accumulating valve 54 is a magnetic switching valve that is urged to a closed position 54a or open position 54b by the application of ON or OFF electric current commands to a solenoid 54c via an electric signal line. When the pressure-accumulating valve 54 is placed in the closed position 54a, the flow of pressure oil into the pressure-accumulating valve 54 is stopped, and when the pressure-accumulating valve 54 is placed in the open position 54b, the pressure oil flows in and out of the pressure-accumulating valve 54 in both directions.

Stopping the supply of pressure oil to the hydraulic cylinder 7 and hydraulic motor 29 through the discharge port 2b of the hydraulic pump 2 contracts the hydraulic cylinder 7 by the gravity of the load 8, and causes the pressure oil to flow out of the hydraulic cylinder 7 via a line 6b. Similarly, the hydraulic motor 29 is actuated by the gravity of the load 10, and pressure oil is caused to flow out of the hydraulic motor 29 via a line 9a.

The return pressure oil flowing out of the hydraulic cylinder 7 and hydraulic motor 29 enters a selection circuit 13. The selection circuit 13 comprises two check valves 14 and 15.

The result of the aforementioned return pressure oil entering the selection circuit 13 is that, of the return pressure oil flowing out of the hydraulic cylinder 7 and hydraulic motor 29, the oil pressurized to a higher degree is selected and allowed to flow out into the line 16. Here, the check valve 17 is in the open position, and the selected return pressure oil is allowed to enter a pressure converter 50. The pressure converter 50 comprises two hydraulic pump motors 51 and 52.

The return pressure oil flowing into the hydraulic pump motor 51 rotates the hydraulic pump motor 51. The hydraulic pump motor 52 is actuated by the rotation of the hydraulic pump motor 51. The pressure oil from the hydraulic pump motor 52 is therefore discharged into a line 53. Here, the pressure-accumulating valve 54 is in the open position, and the pressure oil discharged from the hydraulic pump motor 52 is fed to the accumulator 40 via a line 55. In the accumulator 40, the energy of the pressure oil is stored by being converted to the compression energy of the gas sealed inside. The pressure-accumulating valve 54 is in the closed position, and the high-pressure oil stored in the accumulator 40 is kept in without being allowed to flow out.

The energy of pressure oil is thus recovered and stored. The following operation is performed to regenerate the energy of pressure oil.

Specifically, the pressure oil discharged from the hydraulic pump 2 is fed to the pressure oil supply line 3. Here, the pressure-accumulating valve 54 is in the open position, and the pressure oil stored in pressurized form in the accumulator 40 enters the hydraulic pump motor 52 in addition to the pressure oil discharged from the hydraulic pump 2. The hydraulic pump motor 52 will therefore be rotated by the combined energy of the pressure oil stored in the accumulator 40 and the actuation energy of the hydraulic pump 2.

The rotation of the hydraulic pump motor 52 actuates the hydraulic pump motor 51. Here, the check valve 22 is in the open position, and the pressure oil discharged from the hydraulic pump motor 51 is fed to the pressure oil supply line 3 via the line 21. Pressure oil is therefore fed to the hydraulic cylinder 7 and hydraulic motor 29 at a flow rate obtained by adding the flow rate of the pressure oil discharged from the hydraulic pump motor 51 to the flow rate of the pressure oil discharged from the hydraulic pump 2. The hydraulic cylinder 7 and hydraulic motor 29 are thus operated.

With this hydraulic circuit, energy can be reused in an assembly of hydraulic actuators when the energy of the return pressure oil from these hydraulic actuators is recovered, stored in pressurized form, and regenerated.

All these examples of prior art involve the use of accumulators as energy storing means, however. In many of the commonly used accumulators, nitrogen gas or another gas is sealed at a high pressure. Stored energy is therefore lost in a comparatively short time even without being used. In addition, only small amounts of energy can be stored, making this approach disadvantageous in terms of space. The range of possible applications is therefore limited, particularly for mounting components on construction machinery, and only limited flexibility can be offered in terms of equipment layout.

Energy storage methods are commonly divided into methods (a) for storing the energy of pressure oil in accumulators, methods (b) for storing mechanical energy in flywheels, and methods (c) for storing electric energy in batteries.

The characteristics of these energy storage methods (a), (b), and (c) are shown in FIG. 6. In FIG. 6, the horizontal axis indicates the amount of stored energy per kilogram of equipment, and the vertical axis indicates response (energy conversion speed).

Characteristic (a) indicates that when accumulators are used, energy conversion has adequate response, but the amount of stored energy per unit of weight is lower than that provided by methods (b) and (c).

For example, extremely large accumulators must be used in order to provide the amount of stored energy necessary to achieve normal operation by incorporating these accumulators into the hydraulic circuit of a medium-size hydraulic shovel. Such accumulators are therefore difficult to mount within the confines of a hydraulic shovel.

SUMMARY OF THE INVENTION

With the foregoing in view, it is an object of the present invention to provide a pressure oil energy recovery apparatus or a pressure oil energy recovery/regeneration apparatus that does not require much room and can be mounted within a narrow space, making it possible to broaden the range of applications for recovered energy.

In view of the foregoing, the first invention of the present invention provides a pressure oil energy recovery apparatus, comprising hydraulic actuators (7, 29) actuated by the supply of pressure oil discharged from a hydraulic pump (2), recovery means (13, 16, 17) for recovering return pressure oil flowing out of said hydraulic actuators (7, 29), and energy storage means (18, 19, 20) for storing said recovered return pressure oil by conversion to a prescribed energy form, wherein said energy storage means comprises:

a hydraulic motor (18) actuated by inflow of the return pressure oil flowing out of said hydraulic actuators (7, 29), an electric generator (19) for generating electric energy by receiving a drive force of said hydraulic motor (18), and a battery (20) for storing the electric energy generated by said electric generator (19).

The first invention will now be described with reference to FIG. 1.

According to the first invention, the hydraulic motor 18 is actuated by the inflow of the return pressure oil flowing out of the hydraulic actuators 7 and 29. Inputting the drive force of the hydraulic motor 18 causes the electric generator 19 to generate electric energy. The electric energy generated by the electric generator 19 is stored in the battery 20.

The first invention thus allows the energy of the pressure oil to be recovered and stored as electric energy in the battery 20.

The battery 20 is capable of storing greater amounts of energy than is an accumulator of the same weight and size (see FIG. 6). The battery can thus be mounted within the confines of a hydraulic shovel or other type of construction machinery without occupying too much space. The equipment can therefore be mounted irrespective of the size or type of construction machinery, widening the scope of possible applications.

Furthermore, the second invention provides a pressure oil energy recovery apparatus, comprising a plurality of hydraulic actuators (7, 29) actuated by the supply of pressure oil discharged from a hydraulic pump (2), recovery means (13, 16, 17) for recovering return pressure oil flowing out of said plurality of hydraulic actuators (7, 29), and energy storage means (18, 19, 20) for storing said recovered return pressure oil by conversion to a prescribed energy form, wherein said recovery means comprises:

selection means (13) for recovering return pressure oil by selecting from said plurality of hydraulic actuators (7, 29) a hydraulic actuator to be used for the recovery of the return pressure oil; and said energy storage means comprises:

a hydraulic motor (18) actuated by inflow of the return pressure oil flowing out of the hydraulic actuator selected by said selection means (13), an electric generator (19) for generating electric energy by receiving a drive force of said hydraulic motor (18), and a battery (20) for storing the electric energy generated by said electric generator (19).

The second invention will now be described with reference to FIG. 1.

According to the second invention, the hydraulic motor 18 is actuated by the inflow of the return pressure oil flowing out of the hydraulic actuator selected from the plurality of hydraulic actuators 7 and 29. Inputting the drive force of the hydraulic motor 18 causes the electric generator 19 to generate electric energy. The electric energy generated by the electric generator 19 is stored in the battery 20.

The second invention thus allows the energy of the pressure oil to be recovered and stored as electric energy in the battery 20.

The battery 20 is capable of storing greater amounts of energy than is an accumulator of the same weight and size (see FIG. 6). The battery can thus be mounted within the confines of a hydraulic shovel or other type of construction machinery without occupying too much space. The components can therefore be mounted irrespective of the size or type of construction machinery, widening the scope of possible applications.

It should be noted that using a plurality of hydraulic actuators sometimes causes the pressure of return pressure oil to vary from hydraulic actuator to hydraulic actuator, making it impossible to efficiently recover the return pressure oil because of the backflow effect.

In view of this, the second invention entails selecting from a plurality of hydraulic actuators the hydraulic actuator that is to be used for energy recovery, making it possible to efficiently recover solely the return pressure oil of the required hydraulic actuator.

Furthermore, the third invention provides a pressure oil energy recovery/regeneration apparatus, comprising hydraulic actuators (7, 29) actuated by the supply of pressure oil discharged from a hydraulic pump (2) for actuating hydraulic actuators, recovery means (13, 16, 17) for recovering return pressure oil flowing out of said hydraulic actuators (7, 29), energy storage means (18, 19, 20) for storing said recovered return pressure oil by conversion to a prescribed energy form, and regeneration means (18, 19, 21, 22) for supplementing an energy expended during the actuation of said hydraulic actuators (7, 29) by said hydraulic pump (2) for actuating hydraulic actuators with the energy stored in said energy storage means (18, 19, 20), wherein said energy storage means comprises:
a hydraulic motor (18) used for recovery purposes and actuated by the inflow of the return pressure oil flowing out of said hydraulic actuators (7,29),
an electric generator (19) for generating electric energy by receiving a drive force of said hydraulic motor (18) used for recovery purposes, and
a battery (20) for storing the electric energy generated by said electric generator (19); and
said regeneration means comprises:
regeneration means (18, 19, 21, 22) for supplementing the energy expended during the actuation of said hydraulic actuators (7,29) by said hydraulic pump (2) for actuating hydraulic actuators with the electric energy stored in said battery (20).

The third invention will now be described with reference to FIG. 1.

According to the third invention, the hydraulic motor 18 is actuated by the inflow of the return pressure oil flowing out of the hydraulic actuators 7 and 29. Inputting the drive force of the hydraulic motor 18 causes the electric generator 19 to generate electric energy. The electric energy generated by the electric generator 19 is stored in the battery 20.

When the energy of pressure oil is regenerated, the energy expended during the actuation of the hydraulic actuators 7 and 29 by the hydraulic pump 2 is supplemented with the electric energy stored in the battery 20.

Similar to the first invention, the third invention thus entails storing energy with the aid of a battery 20, thus allowing the equipment to be mounted within the confines of a hydraulic shovel or other type of construction machinery without occupying too much space. The equipment can therefore be mounted irrespective of the size or type of construction machinery, widening the scope of possible applications.

Another feature of the third invention is that the energy expended during the actuation of the hydraulic cylinder 7 and hydraulic motor 29 by the hydraulic pump 2 is supplemented by the regeneration of the electric energy stored in the battery 20. It is therefore possible to lower the output of the drive source (engine 1) of the hydraulic pump 2 while obtaining the same work volume as in the past. The fuel consumption and noise level of the engine 1 can thus be reduced. Conversely, the work volume can be increased when the engine 1 is rotated at the same rotational engine speed as in the past.

Furthermore, the fourth invention provides a pressure oil energy recovery/regeneration apparatus, comprising a plurality of hydraulic actuators (7, 29) actuated by the supply of pressure oil discharged from a hydraulic pump (2) for actuating hydraulic actuators, recovery means (13, 16, 17) for recovering return pressure oil flowing out of said plurality of hydraulic actuators (7, 29), energy storage means (18, 19, 20) for storing said recovered return pressure oil by conversion to a prescribed energy form, and regeneration means (18, 19, 21, 22) for supplementing an energy expended during the actuation of said plurality of hydraulic actuators (7, 29) by said hydraulic pump (2) for actuating hydraulic actuators with the energy stored in said energy storage means (18, 19, 20), wherein said recovery means comprises:
selection means (13) for recovering the return pressure oil by selecting from said plurality of hydraulic actuators (7, 29) a hydraulic actuator to be used for the recovery of the return pressure oil;
said energy storage means comprises:
a hydraulic motor (18) used for recovery purposes and actuated by the inflow of the return pressure oil flowing out of the hydraulic actuator selected by said selection means (13),
an electric generator (19) for generating electric energy by receiving a drive force of said hydraulic motor (18) used for recovery purposes, and
a battery (20) for storing the electric energy generated by said electric generator (19); and
said regeneration means comprises:
regeneration means (18, 19, 21, 22) for supplementing the energy expended during the actuation of said plurality of hydraulic actuators (7, 29) by said hydraulic pump (2) for actuating hydraulic actuators with the electric energy stored in said battery (20).

The fourth invention will now be described with reference to FIG. 1.

According to the fourth invention, the hydraulic motor 18 is actuated by the inflow of the return pressure oil flowing out of the hydraulic actuator selected from the plurality of hydraulic actuators 7 and 29. Inputting the drive force of the hydraulic motor 18 causes the electric generator 19 to generate electric energy. The electric energy generated by the electric generator 19 is stored in the battery 20.

When the energy of pressure oil is regenerated, the energy expended during the actuation of the hydraulic actuators 7 and 29 by the hydraulic pump 2 is supplemented with the electric energy stored in the battery 20.

Similar to the first invention, the fourth invention thus entails storing energy with the aid of a battery 20, thus allowing the equipment to be mounted within the confines of a hydraulic shovel or other type of construction machinery without occupying too much space. The equipment can therefore be mounted irrespective of the size or type of construction machinery, widening the scope of possible applications.

It should be noted that using a plurality of hydraulic actuators sometimes causes the pressure of return pressure oil to vary from hydraulic actuator to hydraulic actuator, making it impossible to efficiently recover the return pressure oil because of the backflow effect. In view of this, the fourth invention entails selecting from a plurality of hydraulic actuators the hydraulic actuator that is to be used for energy recovery, making it possible to efficiently recover solely the return pressure oil of the required hydraulic actuator.

Another feature of the fourth invention is that the energy expended during the actuation of the plurality of hydraulic cylinders 7 and hydraulic motors 29 by the hydraulic pump 2 is supplemented by the regeneration of the electric energy stored in the battery 20. It is therefore possible to lower the output of the drive source (engine 1) of the hydraulic pump 2 while obtaining the same work volume as in the past. The fuel consumption and noise level of the engine 1 can thus be reduced. Conversely, the work volume can be increased when the engine 1 is rotated at the same rotational engine speed as in the past.

Moreover, the fifth invention is such the aforementioned regeneration means of the third or fourth invention is regeneration means (18, 19, 21, 22) whereby a flow rate of the pressure oil discharged from said hydraulic pump (2) for actuating hydraulic actuators is supplemented with the electric energy stored in said battery (20).

The fifth invention will now be described with reference to FIG. 1.

According to the fifth invention, the hydraulic motor 18 is actuated by the inflow of the return pressure oil flowing out of the hydraulic actuators 7 and 29. Inputting the drive force of the hydraulic motor 18 causes the electric generator 19 to generate electric energy. The electric energy generated by the electric generator 19 is stored in the battery 20.

When the energy of pressure oil is regenerated, the flow rate of the pressure oil discharged from the hydraulic pump 2 is supplemented with the electric energy stored in the battery 20.

Thus, the fifth invention has the same merits as the third and fourth inventions.

The fifth invention:is also configured such that the flow rate of the pressure oil discharged from the hydraulic pump 2 is supplemented with the electric energy stored in the battery 20, making it possible, for example, to construct an energy-regenerating circuit and to reduce the number of components for this energy-regenerating circuit merely by providing a simple conduit structure in which a pressure oil supply line 21 is disposed between the hydraulic motor 18 and the hydraulic pump 2, as shown in FIG. 1.

Furthermore, the sixth invention is such the aforementioned regeneration means of the third or fourth invention are regeneration means (23, 24) whereby the electric energy stored in said battery (20) is transmitted from the battery (20) via an electric signal line (23) toward said hydraulic pump (2) for actuating hydraulic actuators, and the actuation of the hydraulic pump (2) for actuating hydraulic actuators is thus enhanced.

The sixth invention will now be described with reference to FIGS. 1 and 3.

According to the sixth invention, the hydraulic motor 18 is actuated by the inflow of the return pressure oil flowing out of the hydraulic actuators 7 and 29. Inputting the drive force of the hydraulic motor 18 causes the electric generator 19 to generate electric energy. The electric energy generated by the electric generator 19 is stored in the battery 20.

When the energy of pressure oil is regenerated, the electric energy stored in the battery 20 is transmitted from this battery 20 toward the hydraulic pump 2 via an electric signal line 23, and the actuation of the hydraulic pump 2 is thus enhanced.

Thus, the sixth invention has the same merits as the third and fourth inventions.

The sixth invention also allows energy to be transmitted with higher efficiency than when a pressure oil supply line 21 is used in the manner shown in FIG. 1 because electric energy is transmitted toward the hydraulic pump 2 by means of an electric signal line 23. In addition, using the electric signal line 23 allows the wiring layout to be changed with greater ease than when the pressure oil supply line 21 is used, and offers flexibility with respect to equipment-specific wiring systems. Another feature is that using the electric signal line 23 makes it possible to reduce costs in comparison with the use of the pressure oil supply line 21, provided the wiring and piping have the same length in both cases.

The seventh invention provides a pressure oil energy recovery/regeneration apparatus, comprising hydraulic actuators (7, 29) actuated by the supply of pressure oil discharged from a hydraulic pump (2) for actuating hydraulic actuators, recovery means (13, 16, 17) for recovering return pressure oil flowing out of said hydraulic actuators (7, 29), energy storage means (18, 19, 20) for storing said recovered return pressure oil by conversion to a prescribed energy form, and regeneration means (18, 19, 21, 22) for supplementing an energy expended during the actuation of said hydraulic actuators (7, 29) by said hydraulic pump (2) for actuating hydraulic actuators with:the energy stored in said energy storage means (18, 19, 20), wherein said energy storage means comprises:
a hydraulic motor (18) used for recovery purposes and actuated by the inflow of the return pressure oil flowing out of said hydraulic actuators (7, 29),
an electric generator (19) for generating electric energy by receiving a drive force of said hydraulic motor (18) used for recovery purposes, and
a battery (20) for storing the electric energy generated by said electric generator (19); and said regeneration means comprises:
an electric motor (19) actuated by receiving the electric energy stored in said battery (20), and
a hydraulic pump (18) used for regeneration purposes, designed to enhance the energy expended during the actuation of said hydraulic actuators (7, 29) by said hydraulic pump (2) for actuating hydraulic actuators, and actuated by receiving a drive force of said electric generator (19).

The seventh invention will now be described with reference to FIG. 1.

According to the seventh invention, the hydraulic motor 18 is actuated by the inflow of the return pressure oil flowing out of the hydraulic actuators 7 and 29. Inputting the drive force of the hydraulic motor 18 causes the electric generator 19 to generate electric energy. The electric energy generated by the electric generator 19 is stored in the battery 20.

When the energy of pressure oil is regenerated, the electric generator 19 is actuated by the input of the electric energy stored in the battery 20. Energy is enhanced when the hydraulic pump 18 is actuated by inputting the drive force of the electric generator 19, and the hydraulic pump 2 actuates the hydraulic actuators 7 and 29.

Thus, the seventh invention has the same merits as the third and fourth inventions.

The seventh invention is also configured such that the energy expended when the electric generator 19 and hydraulic pump 18 are actuated and the hydraulic pump 2 actuates the hydraulic actuators 7 and 29 is supplemented with the electric energy stored in the battery 20, making it possible, for example, to construct an energy-regenerating circuit and to reduce the number of components for this energy-regenerating circuit merely by providing a simple conduit structure in which a pressure oil supply line 21 is disposed between the hydraulic pump 18 and the hydraulic pump 2, as shown in FIG. 1.

BRIEF DESCRIPTION OF THE DRAWINGS

FIG. 8(a) is a hydraulic circuit diagram illustrating a conventional pressure oil energy recovery/regeneration apparatus;

FIG. 8(b) is a diagram depicting the structure of a pressure-accumulating valve; and FIG. 8(c) is a diagram depicting the structure of a check valve.

DESCRIPTION OF THE PREFERRED EMBODIMENTS

Embodiments of the pressure oil energy recovery apparatus and the energy recovery/regeneration apparatus pertaining to the present invention will now be described with reference to drawings. The embodiments will be described with reference to applications in which the apparatus are incorporated into the hydraulic circuit of a hydraulic shovel or other type of construction machinery.

The present invention is not limited by these applications and may include cases in which the apparatus is incorporated into any type of hydraulic circuit. Another feature is that although the present embodiments are configured such that the energy of the return pressure oil from hydraulic actuators is recovered, stored in pressurized form, and reused in the same hydraulic actuators, any other arrangement for reusing the recovered energy may be adopted.

Figure 1A:
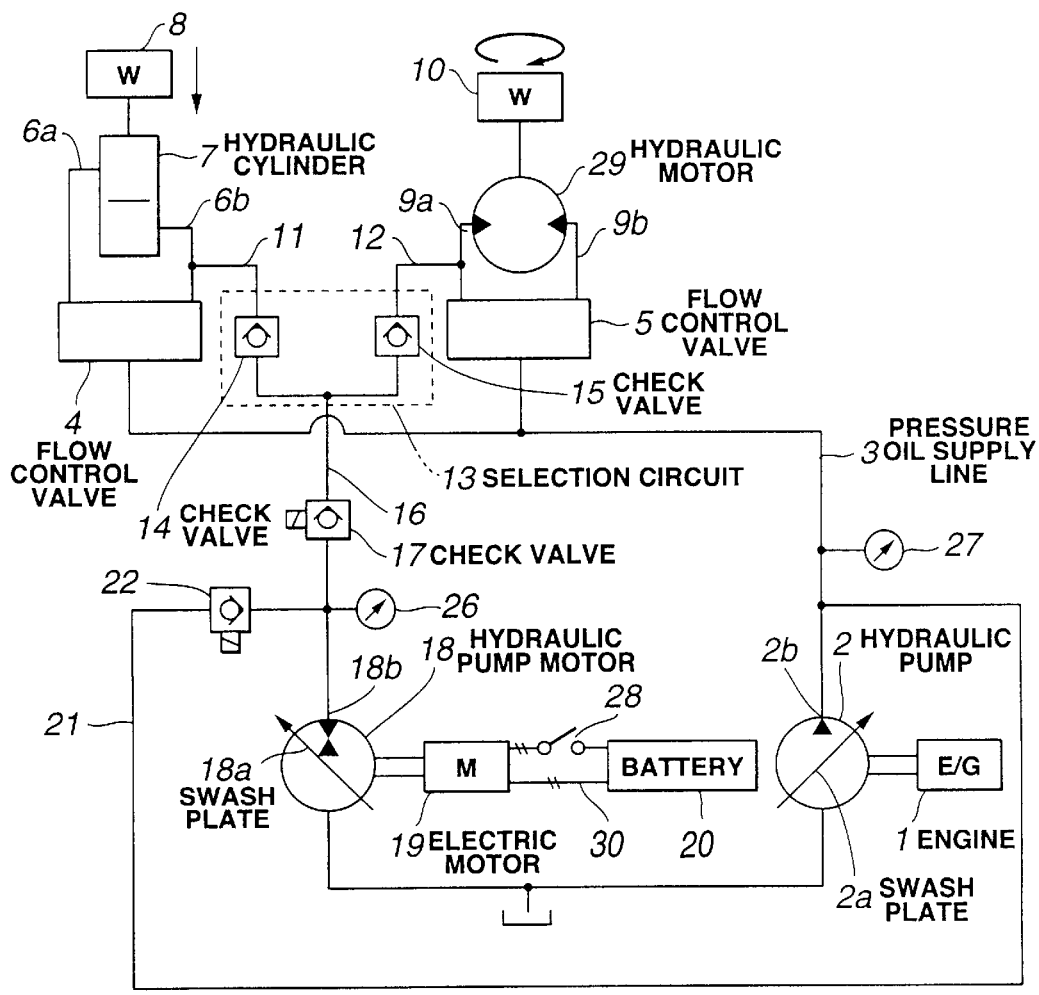
FIG. 1(a) is a diagram depicting a hydraulic circuit containing a pressure oil energy recovery/regeneration apparatus according to an embodiment.

The hydraulic circuit depicted in FIG. 1(a) is similar to the hydraulic circuit depicted in FIG. 8(a) in that when the energy of the return pressure oil from a plurality of hydraulic actuators is recovered, stored in pressurized form, and regenerated, this energy can be reused in all the hydraulic actuators.

Specifically, the hydraulic circuit depicted in FIG. 1(a) is such that a plurality of hydraulic actuators (that is, a hydraulic cylinder 7 and a hydraulic motor 29) are actuated, and the corresponding loads 8 (for example, the arm of a hydraulic shovel) and 10 (for example, the revolving superstructure of the hydraulic shovel) are operated according to a procedure in which the pressure oil discharged from a hydraulic pump 2 is fed to the hydraulic cylinder 7 and hydraulic motor 29 via a pressure oil supply line 3.

The hydraulic pump 2 is a variable-capacity hydraulic pump actuated by the engine 1. The flow rate (cc/rev) of the pressure oil discharged from the pressure oil discharge port 2b is varied by varying the inclined rotation angle of the swash plate 2a of the hydraulic pump 2.

The pressure of the pressure oil discharged from the hydraulic pump 2 is sensed by a pressure gage 27 provided to the pressure oil supply line 3.

The pressure oil supply line 3 is connected to flow control valves 4 and 5.

The flow control valves 4 and 5 are provided such that they correspond to the hydraulic cylinder 7 and hydraulic motor 29, and are used to control the flow rates of the pressure oil fed to the hydraulic cylinder 7 and hydraulic motor 29. The flow control valve 4 functions as a directional control valve that controls the direction of flow of the pressure oil discharged from the hydraulic pump 2 and feeds the pressure oil to the line 6a or 6b. The hydraulic cylinder 7 is thereby contracted or expanded. Similarly, the flow control valve 5 functions as a directional control valve that controls the direction of flow of the pressure oil discharged from the hydraulic pump 2 and feeds the pressure oil to the line 9a or 9b. The hydraulic motor 29 is thereby rotated forward or backward.

A recovery line 11 branches off from the line 6b between the flow control valve 4 and the hydraulic cylinder 7. Similarly, a recovery line 12 branches off from the line 9a between the flow control valve 5 and the hydraulic motor 29.

The recovery line 11 is provided with a check valve 14, and the recovery line 12 is provided with a check valve 15. A selection circuit 13 is composed of these check valves 14 and 15.

The pressure oil outlet of the selection circuit 13 and the port 18b of the hydraulic pump motor 18 are connected by a recovery line 16. The recovery line 16 is provided with a check valve 17.

Figure 1B:
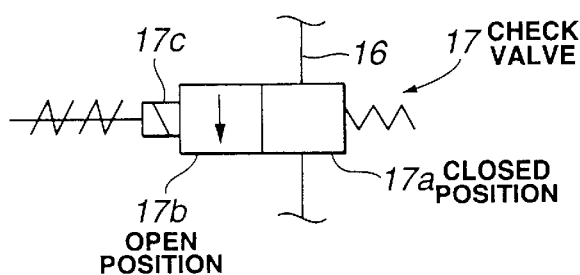
FIGS. 1(b) and 1(c) are diagrams depicting the structures of check valves.
Figure 1C:
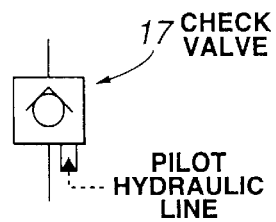

A detailed structure of this check valve 17 is depicted in FIG. 1(b). As shown in FIG. 1(b), the check valve 17 is a magnetic switching valve that is urged to a closed position 17a or open position 17b by the application of an ON or OFF electric current command to a solenoid 17c via an electric signal line. When the check valve 17 is in the closed position 17a, the flow of pressure oil into the check valve 17 is stopped, and when the check valve 17 is in the open position 17b, the pressure oil flows in and out of the check valve 17 in a single direction. A controller (not shown) issues electric current commands for the check valve 17. Although it has been stated that a magnetic switching valve is used as the check valve 17, a valve that is opened and closed in accordance with the magnitude of the pilot pressure of pilot pressure oil introduced via a pilot hydraulic line may also be used as the check valve 17, as shown in FIG. 1(c). In this case, the pilot pressure oil that operates the flow control valve 5 is used as the pilot pressure oil for operating the check valve 17.

The hydraulic pump motor 18 is a hydraulic actuator that has dual action: as a motor actuated by the inflow of pressure oil, and as a pump for discharging the pressure oil by the input of a drive force.

In addition, the electric motor 19 is an electric actuator that has dual action: as a generator for generating electric energy by the application of a drive force, and as a motor for outputting a drive force by the input of electric energy.

Furthermore, the battery is an energy storage means for storing electric energy.

The hydraulic pump motor 18 and the electric motor 19 are connected by an axle for transmitting the drive force. In addition, the electric motor 19 and the battery 20 are electrically connected by an electric signal line 30. The electric signal line 30 is provided with a switch 28 for switching on and off (enabling/disabling) the supply of the electric energy stored in the battery 20 to the electric motor 19. The switch 28 is opened and closed by the aforementioned controller.

The hydraulic pump motor 18 is a variable-rate device for varying the flow rate (cc/rev) of the pressure oil discharged from the port 18b by varying the inclined rotation angle of a swash plate 18a.

The port 18b of the hydraulic pump motor 18 and the pressure oil supply line 3 (discharge port 2b of the hydraulic pump 2) are connected by a regeneration line 21.

The pressure of the pressure oil discharged from the port 18b of the hydraulic pump motor 18 is sensed by a pressure gage 26 provided to the regeneration line 21.

The sensing results from the pressure gages 26 and 27 are fed back to the aforementioned controller, which actuates the swash plate 2a of the hydraulic pump 2 and the swash plate 18a of the hydraulic pump motor 18.

The regeneration line 21 is provided with a check valve 22. This check valve 22 has the same structure as the check valve 17 shown in FIG. 1(b). The aforementioned controller outputs electric current commands for the check valve 22.

The operation of the hydraulic circuit shown in FIG. 1(a) will now be described.

A control routine is performed such that the check valve 17 is in the open position and the check valve 22 in the closed position when the energy of pressure oil is recovered.

Stopping the supply of pressure oil to the hydraulic cylinder 7 and hydraulic motor 29 through the discharge port 2b of the hydraulic pump 2 contracts the hydraulic cylinder 7 by the gravity of the load 8, and causes the pressure oil to flow out of the hydraulic cylinder 7 via a line 6b. Similarly, the hydraulic motor 29 is actuated by the gravity of the load 10, and the pressure oil is caused to flow out of the hydraulic motor 29 via a line 9a.

The return pressure oil flowing out of the hydraulic cylinder 7 and hydraulic motor 29 enters the selection circuit 13 via the recovery lines 11 and 12.

The return pressure oil from the hydraulic cylinder 7 flows into the check valve 14 of the selection circuit 13, and the return pressure oil from the hydraulic motor 29 flows into the check valve 15. As a result, the oil pressurized to a higher degree is selected from the return pressure oil flowing out of the hydraulic cylinder 7 and hydraulic motor 29, and this oil is caused to flow from the selection circuit 13 into the recovery line 16. The return pressure oil thus selected is caused to flow into the port 18b of the hydraulic pump motor 18 because the check valve 17 is in the open position, and the check valve 22 is in the closed position.

The hydraulic pump motor 18 is rotated by the flow of return pressure oil into the hydraulic pump motor 18.

The drive force of the hydraulic pump motor 18 is transmitted to the electric motor 19. Consequently, the electric motor 19 is actuated, and the drive force is converted to electric energy.

The electric energy generated by the electric motor 19 is fed to the battery 20 via the electric signal line 30. Electric energy is therefore stored in the battery 20.

Opening the switch 28 stops the supply of electric energy from the battery 20 to the electric motor 19 and preserves the electric energy stored in the battery 20.

The energy of pressure oil is thus recovered and stored.

When the energy of the pressure oil is regenerated, a control routine is performed such that the check valve 17 is urged into the closed position and the check valve 22 is urged into the open position. In addition, the switch 28 is closed.

The electric energy stored in the battery 20 is fed to the electric motor 19 via the electric signal line 30. As a result, the electric motor 19 is rotatably actuated.

The drive force generated by the electric motor 19 is transmitted to the hydraulic pump motor 18. Consequently, the hydraulic pump motor 18 is actuated, and the pressure oil is discharged from the discharge port 18b of the hydraulic pump motor 18. Here, the pressure oil discharged from the hydraulic pump motor 18 is fed to the pressure oil supply line 3 (discharge port 2b of the hydraulic pump 2) via the regeneration line 21 because the check valve 17 is in the closed position, and the check valve 22 in the open position.

Pressure oil is therefore fed to the hydraulic cylinder 7 and hydraulic motor 29 at a flow rate obtained by adding the flow rate of the pressure oil discharged from the hydraulic pump motor 18 to the flow rate of the pressure oil discharged from the hydraulic pump 2. The hydraulic cylinder 7 and hydraulic motor 29 are thus operated.

The sensing results from the pressure gages 26 and 27 are fed back to the aforementioned controller. The controller actuates the swash plate 2a of the hydraulic pump 2 and the swash plate 18a of the hydraulic pump motor 18 on the basis of the aforementioned sensing results.

With the hydraulic circuit of the present embodiment, energy can be reused in an assembly composed of a plurality of hydraulic actuators 7 and 29 when the energy of the return pressure oil from the plurality of hydraulic actuators 7 and 29 is thus recovered, stored in pressurized form, and regenerated.

Figure 6:
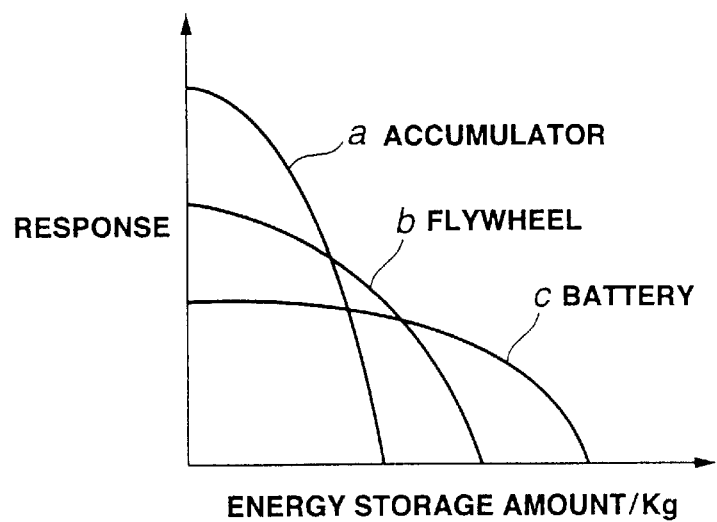
FIG. 6 is a graph depicting a comparison among energy storage methods.
Figure 7:
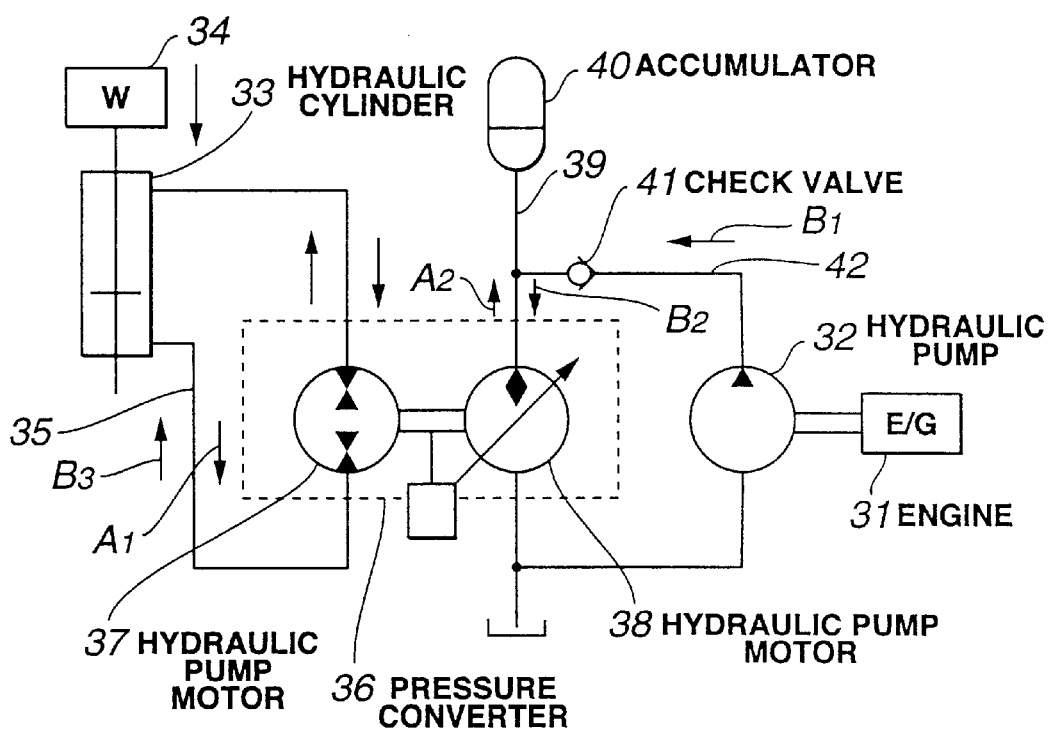
FIG. 7 is a hydraulic circuit diagram illustrating a conventional pressure oil energy recovery/regeneration apparatus.

The present embodiment is configured such that the energy of pressure oil is recovered and stored as electric energy in a battery 20. Greater amounts of energy can therefore be stored than with an accumulator of the same weight and size, as shown in FIG. 6. The equipment can thus be mounted within the confines of a hydraulic shovel or other type of construction machinery without occupying too much space. The equipment can therefore be mounted irrespective of the size or type of construction machinery, widening the scope of possible applications.

The present embodiment is also configured such that the energy expended during the actuation of the hydraulic cylinder 7 and hydraulic motor 29 by the hydraulic pump 2 is supplemented by the regeneration of the electric energy stored in the battery 20. It is therefore possible to lower the output of the engine 1 (drive source) of the hydraulic pump 2 while obtaining the same work volume as in the past. The fuel consumption and noise level of the engine 1 can thus be reduced. Conversely, the work volume can be increased when the engine 1 is rotated at the same rotational engine speed as in the past.

Another feature of the embodiment depicted in FIG. 1 is that an energy-regenerating circuit can be constructed merely by providing a simple conduit structure in which a pressure oil supply line 21 is disposed between the hydraulic pump motor 18 and the hydraulic pump 2. The number of components for this energy-regenerating circuit can therefore be reduced.

Various modifications can be suggested for the hydraulic circuit depicted in FIG. 1.

In the hydraulic circuit depicted in FIG. 1, return pressure oil can be selected and recovered from a plurality of hydraulic actuators 7 and 29. It is possible, however, to limit such recovery to the return pressure oil from a specific hydraulic actuator 7, as shown in FIG. 2.

Figure 2:
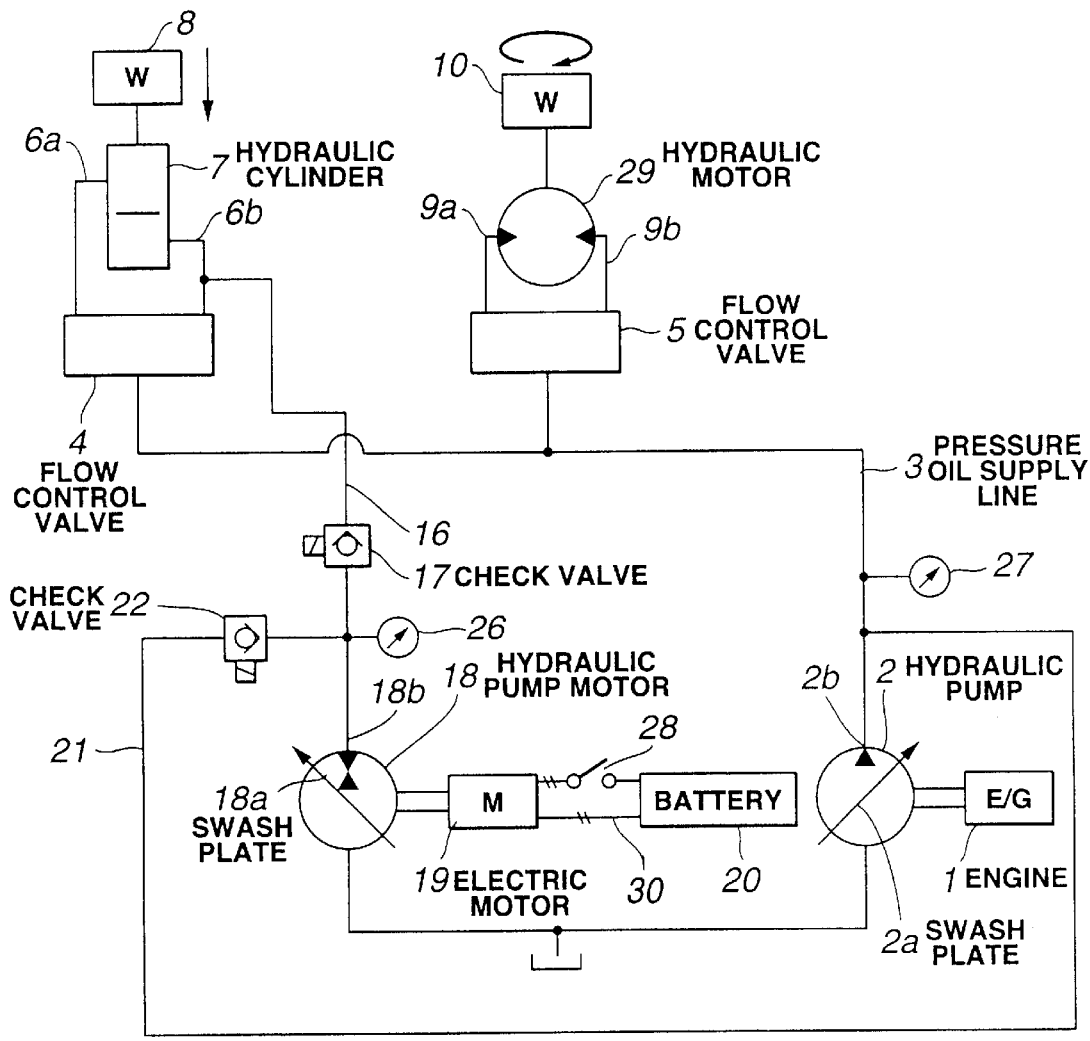
FIG. 2 is a diagram depicting a modified structure of the hydraulic circuit shown in FIG. 1.

In the hydraulic circuit depicted in FIG. 2, the line 6b and the port 18b of the hydraulic pump motor 18 are connected by a recovery line 16, and the return pressure oil from the hydraulic cylinder 7 alone is recovered into the hydraulic pump motor 18 via the recovery line 16.

An arrangement in which the return pressure oil from the hydraulic motor 29 alone is recovered into the hydraulic pump motor 18 via the recovery line 16 may also be adopted as a structure identical to the one shown in FIG. 2.

In addition, the hydraulic circuit depicted in FIG. 1 is configured such that energy can be reused by all the hydraulic actuators 7 and 29 as a result of the fact that the pressure oil discharged from the hydraulic pump motor 18 is fed to the pressure oil supply line 3 via the regeneration line 21. An alternative is an arrangement in which energy can be reused only for specific hydraulic actuators.

It is, for example, possible to adopt an arrangement in which the pressure oil discharged from the hydraulic pump 18 is fed directly to the hydraulic cylinder 7 alone, making it possible to reuse the energy only in the hydraulic cylinder 7. Similarly, an arrangement may be adopted such that the pressure oil discharged from the hydraulic pump 18 is fed directly to the hydraulic motor 29 alone, making it possible to reuse the energy only in the hydraulic motor 29.

Another feature of the hydraulic circuit depicted in FIG. 1 is that the energy of pressure oil is recovered and reused by the combined action of the hydraulic pump motor 18 as a motor and a pump, and of the electric motor 19 as a generator and a motor. An alternative is an arrangement in which the energy of the pressure oil is recovered and reused by separate pieces of equipment. It is, for example, possible to replace the hydraulic pump motor 18 with a separate hydraulic motor used for recovery purposes and a separate hydraulic pump used for regeneration purposes, to replace the electric motor 19 with a separate electric generator used for recovery purposes and a separate electric generator used for regeneration purposes, to recover the energy of pressure oil and to store electric energy in the battery 20 by operating the aforementioned hydraulic motor used for recovery purposes and the aforementioned electric generator used for recovery purposes, and to regenerate the electric energy stored in the battery 20 by operating the aforementioned electric generator used for regeneration purposes and the aforementioned hydraulic pump used to regeneration purposes.

Yet another feature of the hydraulic circuit depicted in FIG. 1 is that the flow rate of the pressure oil discharged from the hydraulic pump 2 is supplemented with the electric energy stored in the aforementioned battery 20, enhancing the energy expended during the actuation of the hydraulic cylinder 7 and hydraulic actuator 29 by the hydraulic pump 2.

It is, however, possible to adopt any structure for enhancing the energy expended during the actuation of the hydraulic cylinder 7 and hydraulic actuator 29 by the hydraulic pump 2.

Figure 3:
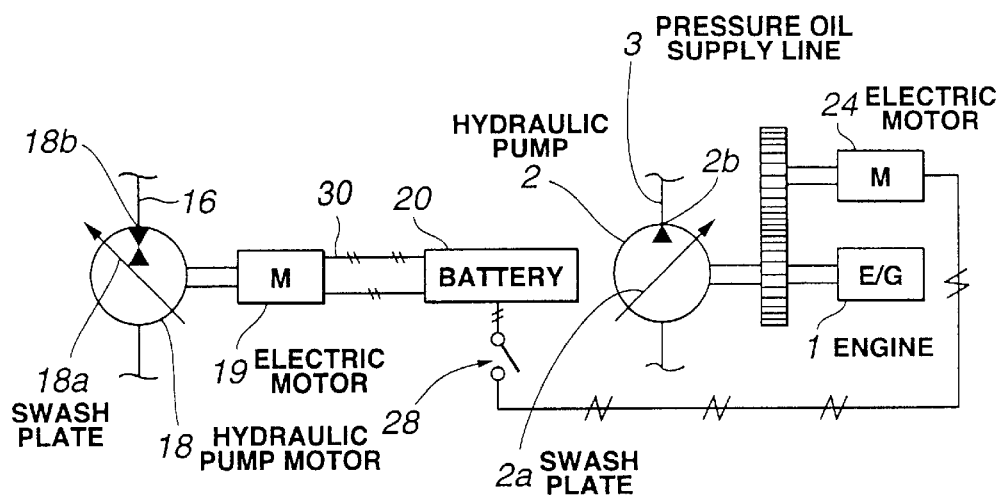
FIG. 3 is a diagram depicting a structure of a circuit for reusing energy.

In one possible structure, the drive force exerted during the actuation of the hydraulic pump 2 by the engine 1 is supplemented with the electric energy stored in the battery 20, as shown in FIG. 3.

In the circuit depicted in FIG. 3, the battery 20 and the electric motor 24 disposed on the side of the hydraulic pump 2 are electrically connected by an electric signal line 23. The output shaft of the electric motor 24 is connected to the hydraulic pump 2 through the agency of gears or the like.

The electric energy stored by the battery 20 is therefore fed to the electric motor 24 via the electric signal line 23 when the energy of pressure oil is regenerated. Consequently, the electric motor 24 is rotatably driven, and the drive force is transmitted to the hydraulic pump 2 by means of the aforementioned output shaft, gears, and the like. The drive force exerted during the actuation of the hydraulic pump 2 by the engine 1 is thus supplemented with the drive force of the electric motor 24.

In the embodiment depicted in FIG. 3, electric energy is transmitted toward the hydraulic pump 2 by means of the electric signal line 23, allowing the energy to be transmitted with higher efficiency than when a pressure oil supply line 21 is used in the manner shown in FIG. 1. In addition, using the electric signal line 23 allows the wiring layout to be changed with greater ease than when the pressure oil supply line 21 is used, and offers flexibility with respect to equipment-specific wiring systems. Another feature is that using the electric signal line 23 makes it possible to reduce costs in comparison with the use of the pressure oil supply line 21, provided the wiring and piping have the same length in both cases.

In the embodiment depicted in FIG. 3, the drive force exerted during the actuation of the hydraulic pump 2 by the engine 1 is supplemented with the drive force of the electric motor 24. Another possible arrangement is one in which a hydraulic motor 25 is used instead of the electric motor 24 in the manner shown in FIG. 4, and the drive force exerted during the actuation of the hydraulic pump 2 by the engine 1 is supplemented with the drive force of the hydraulic motor 25.

Figure 4:
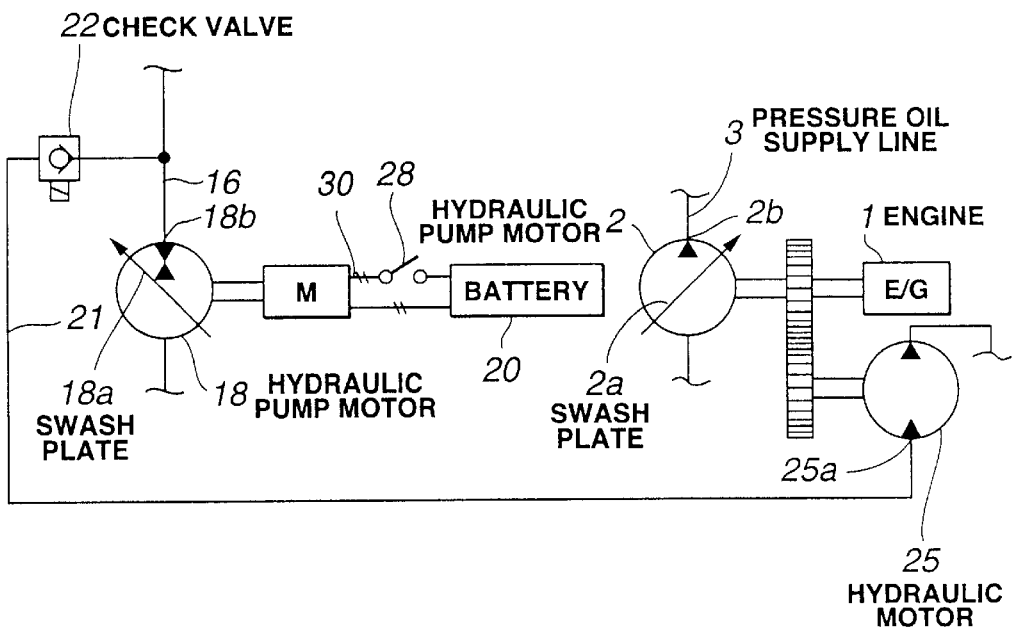
FIG. 4 is a diagram depicting a structure of a circuit for reusing energy.

In the circuit depicted in FIG. 4, the port 18b of the hydraulic pump motor 18 and the port 25a of the hydraulic motor 25 disposed on the side of the hydraulic motor 25 are connected by a pressure oil supply line 21. The output shaft of the hydraulic motor 25 is connected to the hydraulic pump 2 through the agency of gears or the like.

The pressure oil discharged from the hydraulic pump motor 18 is therefore caused to flow into the port 25a of the hydraulic motor 25 via the pressure oil supply line 21 when the energy of the pressure oil is regenerated. Consequently, the hydraulic motor 25 is rotatably driven, and the drive force is transmitted to the hydraulic pump 2 by means of the aforementioned output shaft, gears, and the like. The drive force exerted during the actuation of the hydraulic pump 2 by the engine 1 is thus supplemented with the drive force of the hydraulic motor 25.

Thus, the embodiment depicted in FIG. 4 entails using a hydraulic motor 25 and makes it possible to achieve higher output at the same capacity in comparison with the case in which an electric motor 24 is used, as shown in FIG. 3.

Figure 5:
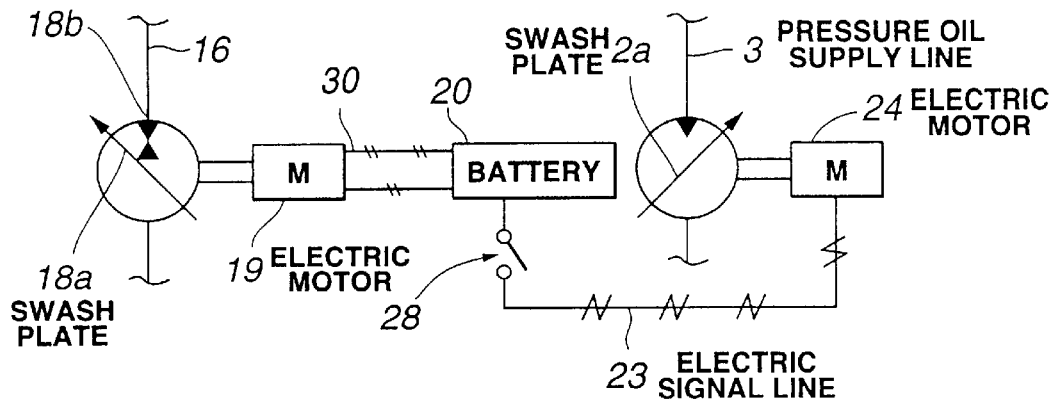
FIG. 5 is a diagram depicting a structure of a circuit for reusing energy.

It is also possible to adopt a configuration in which the electric motor 24 serves as a direct drive source for the hydraulic pump 2, as shown in FIG. 5.

In the circuit depicted in FIG. 5, the battery 20 and the electric motor 24, which is the drive source of the hydraulic pump 2, are electrically connected by an electric signal line 23. The electric motor 24 is supplied with power via an electric signal line (not shown). During normal operation, the electric motor 24 is actuated by the supplied power, in turn actuating the hydraulic pump 2.

When the energy of pressure oil is regenerated, the electric energy stored by the battery 20 is fed to the electric motor 24 via the electric signal line 23. The rotational drive force of the electric motor 24 is therefore supplemented with the electric energy stored in the battery 20, and is transmitted to the hydraulic pump 2. The drive force exerted during the actuation of the hydraulic pump 2 by the electric motor 24 is thus supplemented with the electric energy stored in the battery 20.

What is claimed is:

1. A pressure oil energy recovery/regeneration apparatus, comprising hydraulic actuators actuated by the supply or pressure oil discharged from a hydraulic pump for actuating hydraulic actuators, main drive means for driving the hydraulic pump, recovery means for recovering return pressure oil flowing out of said hydraulic actuators, energy storage means for storing said recovered return pressure oil by conversion to a prescribed energy form, and regeneration means for supplementing an energy expended during the actuation of said hydraulic actuators by said hydraulic pump for actuating hydraulic actuators with the energy stored in said energy storage means, wherein said energy storage means comprises:

a hydraulic motor used for recovery purposes and actuated by the inflow of the return pressure oil flowing out of said hydraulic actuators, said hydraulic motor being a separate device from the hydraulic pump for actuating hydraulic actuators, an electric generator for generating electric energy by receiving a drive force of said hydraulic motor used for recovery purposes, said electric generator being a separate device from said hydraulic pump for actuating hydraulic actuators, and a battery for storing the electric energy generated by said electric generator, said battery being a separate device from the main drive means, and said regeneration means comprises:

supplemental drive means for driving the hydraulic pump for actuating hydraulic actuators by the electric energy stored in said battery said supplemental drive means being a separate device from the main drive means.

2. The pressure oil energy recovery/regeneration apparatus according to claim 1, wherein said supplemental drive means comprises a supplemental electric motor driven by the supply of the stored electric energy.

3. The pressure oil energy recovery/regeneration apparatus according to claim 1, wherein said supplemental drive means comprises a supplemental hydraulic motor driven by the inflow of the hydraulic oil discharged from the hydraulic motor, when the electric generator acts as an electric motor by the supply of the stored electric energy and the hydraulic motor acts as a pump.

4. A pressure oil energy recovery/regeneration apparatus, comprising a plurality of hydraulic actuators actuated by the supply of pressure oil discharged from a hydraulic pump for actuating hydraulic actuators, main drive means for driving said hydraulic pump, recovery means for recovering return pressure oil flowing out of said plurality of hydraulic actuators, energy storage means for storing said recovered return pressure oil by conversion to a prescribed energy form, and regeneration means for supplementing an energy expended during the actuation of said plurality of hydraulic actuators by said hydraulic pump for actuating hydraulic actuators with the energy stored in said energy storage means, wherein said recovery means comprises:

selection means for recovering the return pressure oil by selecting from said plurality of hydraulic actuators a hydraulic actuator to be used for the recovery of the return pressure oil;

said energy storage means comprises:

a hydraulic motor used for recovery purposes and actuated by the inflow of the return pressure oil flowing out of the hydraulic actuator selected by said selection means, said hydraulic motor being a separate device from the hydraulic pump for actuating hydraulic actuators, an electric generator for generating electric energy by receiving a drive force of said hydraulic motor used for recovery purposes, said electric generator being a separate device from the hydraulic pump for actuating hydraulic actuators, and a battery for storing the electric energy generated by said electric generator, said battery being a separate device from said main drive means; and said generation means comprises:

supplemental drive means for driving the hydraulic pump for driving hydraulic actuators by the electric energy stored in said battery, said supplemental drive means being a separate device from the main drive means.

5. The pressure oil energy recovery/regeneration apparatus according to claim 4, wherein said supplemental drive means comprises a supplemental electric motor which is driven by the supply of stored electric energy.

6. The pressure oil energy recovery/regeneration apparatus according to claim 4, wherein said supplemental drive means comprises a supplemental hydraulic motor driven by the inflow of the hydraulic oil discharged from the hydraulic motor, when the electric generator acts as an electric motor by the supply of the stored electric energy and the hydraulic motor acts as a pump.

7. A pressure oil energy recovery/regeneration apparatus, comprising hydraulic actuators actuated by the supply of pressure oil discharged from a hydraulic pump for actuating hydraulic actuators, recovery means for recovering return pressure oil flowing out of said hydraulic actuators, energy storage means for storing said recovered return pressure oil by conversion to a prescribed energy form, and regeneration means for supplementing an energy expended during the actuation of aid hydraulic actuators by said hydraulic pump for actuating hydraulic actuators with the energy stored in said energy storage means, said regeneration means being a separate device from the energy storage means, wherein said energy storage means comprises:

a hydraulic motor used for recovery purposes and actuated by the inflow of the return pressure oil flowing out of said hydraulic actuators, said hydraulic motor being a separate device from the hydraulic pump for actuating hydraulic actuators, and electric generator for generating electric energy by receiving a drive force of said hydraulic motor used for recovery purposes, and a battery for storing the electric energy generated by said electric generator; and said regeneration means comprises:

an electric motor actuated by receiving the electric energy stored in said battery, and a regeneration hydraulic pump used for regeneration purposes, designed to enhance the energy expended during the actuation of said hydraulic actuators by said hydraulic pump for actuating hydraulic actuators, and actuated by receiving a drive force of said electric motor.

* * * * *